Feb. 2, 1937.  R. R. DONALDSON, JR  2,069,199
PRESSURE REGULATING DEVICE
Filed May 9, 1931
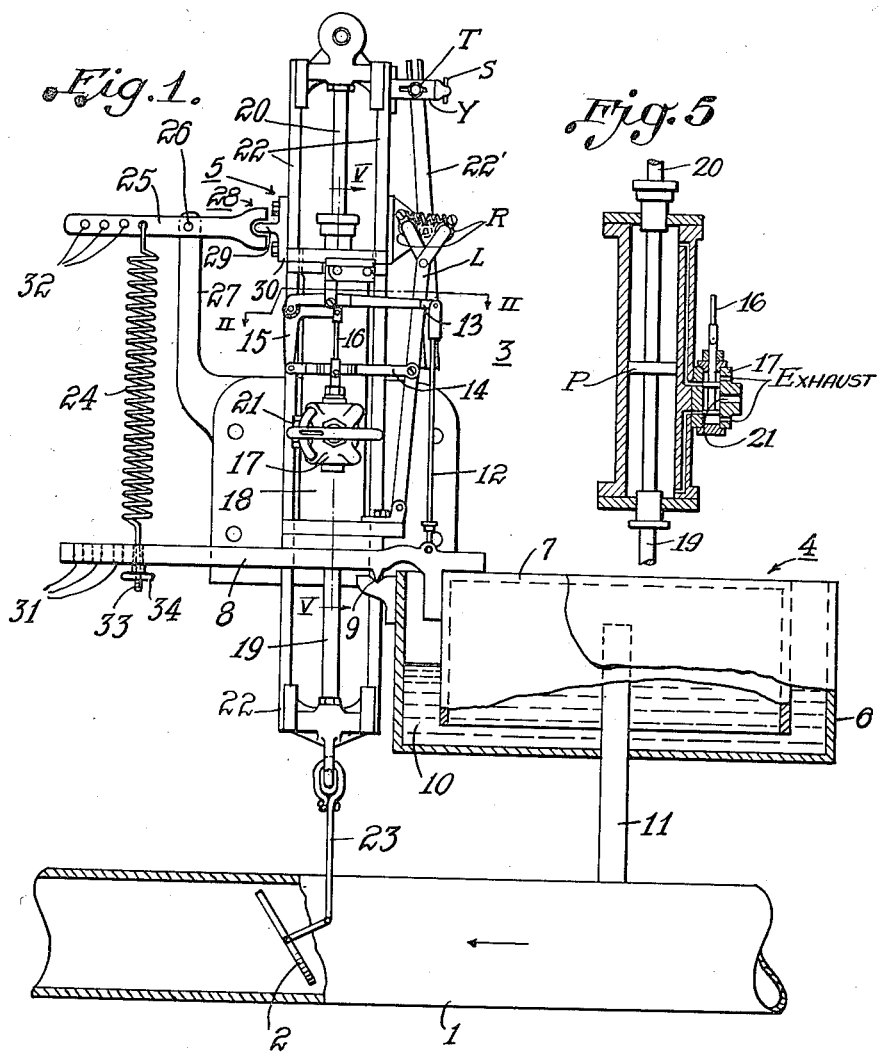
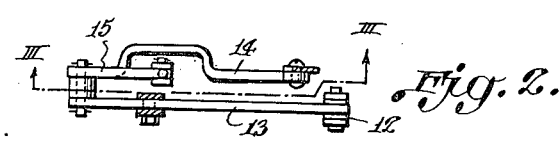
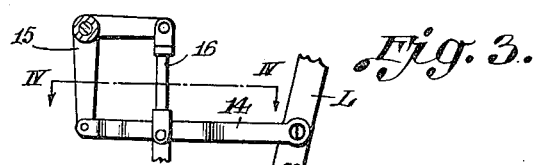
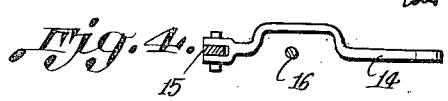
INVENTOR
Robert R. Donaldson
By Green & McCallister
His Attorneys Patented Feb. 2, 1937

2,069,199

UNITED STATES PATENT OFFICE 2,069,199

PRESSURE REGULATING DEVICE

Robert R. Donaldson, Jr., Pittsburgh, Pa., assignor to John M. Hopwood, Dormont, Pa.

Application May 9, 1931, Serial No. 536,298

11 Claims. (Cl. 50—10)

This invention relates to pressure regulators or regulating devices and more particularly to compensating arrangements for the prevention of hunting of such regulators or devices when in operation.

In certain industrial operations, it is required to supply gas and air at predetermined pressures and to so control such pressures that they shall deviate only minutely from that constant value sought to be maintained. Some operations require that the pressures to be maintained constant shall not vary more than 0.01 inch water pressure. For example, in the operation of coke ovens it is required to maintain the gas pressures therein at some predetermined value, variations or departures in pressure from that value of approximately 0.01 inch water pressure being permitted. Another application in which the pressure must be controlled within very close limits is where air is supplied to fuel burning devices such as are employed in boiler furnaces. In the latter case the amount of air supplied to the burners for a given amount of fuel being burned per unit of time, must be so regulated that the pressure of the air supplied shall remain substantially constant at some fixed value in order that efficient combustion may take place. In controlling the pressure of air supplied to burners of boiler furnaces, variations or departures from the predetermined value to be maintained, to the extent of 0.01 inch, or so, water pressure, are permissible as they do not affect materially the efficiency of combustion.

In order to regulate the pressure of gases or of air within such close limits, a pressure responsive device or actuating means is required that is light in weight, carefully balanced, and free to move on the slightest change or variation in pressure. The movements of such regulators or pressure responsive devices are utilized in most cases to operate a damper or valve in such a direction that the pressure of the air or of the gases under control are restored to that value to be maintained substantially constant.

Where pressures are being regulated or controlled within very close limits, certain difficulties arise which ordinarily occasion hunting of the pressure responsive device, regulator or actuating means, permitting the pressures being controlled to vary ten times or more from the permissible variation. Also, it is not unusual for the pressure of air or gas to change a considerable amount if correction is not promptly made. If correction is not promptly made, a change in operating pressures or conditions might be brought about, which if not promptly corrected, would cause the controlled pressure to vary ten times more than the amount of permissible variation. Naturally, such abnormal changes in the controlled pressure would tend to produce sudden and abnormal movements of the pressure element, regulator or actuating means, and cause them to move to the limits of their travels. Extreme movements of the pressure element, regulator or actuating means would occasion quick movements of the damper or other device actuated thereby and by means of which the regulator maintains the pressure at the desired value.

It often happens that where the pressure element, regulator or actuating means moves an abnormal amount, the change in operating conditions causing such movement, requires only a small movement of the damper controlling the pressure in order to restore the pressure to that value which would re-establish the desired operating conditions.

It is an object of this invention to provide a control element, regulator or actuating means of such arrangement and operating characteristics that only such movements utilizable for controlling dampers and the like shall take place as are necessary to establish or maintain a desired operating condition.

Another object of the invention is the provision of a non-hunting regulator that shall be operable in response to minute changes in pressure to actuate a damper, control valve or the like in accordance with or commensurate with the change in pressure.

Other objects of the invention will, in part, be obvious and will, in part, be apparent from the following description taken in conjunction with the accompanying drawing in which;

Figure 1 illustrates one form of a regulator, arranged and constructed in accordance with the invention, for operating a damper, located in a pipe line or conduit through which air, gas or fluid, under pressure, flows;

Fig. 2 is a top plan view as seen in the direction of line II—II, Fig. 1, of a pilot valve operating mechanism;

Fig. 3 is a view in front elevation of the same mechanism;

Fig. 4 is a view in section of the valve operating mechanism taken on line IV—IV of Fig. 3; and Fig. 5 is a partial sectional view of the regulator taken on line V—V of Fig. 1.

In the drawing a pipe line 1 is shown through which air or gas or other fluid under pressure flows. A damper 2 is disposed in the pipe line and may be utilized to so control the volume rate of flow of the air, gas or other fluid through the pipe line that the pressure in a section of the line may be maintained substantially constant at some predetermined value.

In order that damper 2 may be operated to different positions in response to variations in pressure from that value to be maintained in the pipe line, a regulating device 3 is provided. As the pressure in the pipe line varies or changes from the value to be maintained therein, the damper 2 is operated to such a position that the proper volume flow of gas, air or other fluid may take place.

Regulator 3 comprises an actuating means or pressure responsive element 4, that is responsive to the pressure in a section of pipe line 1 to the right of damper 2, and a device 5 for operating the damper 2.

Pressure element 4 is arranged to control the operation of the operating element 5 at such times as the pressure in line 1 on the right side of damper 2 varies or departs from that pressure to be maintained at a substantially constant value.

The actuating means or pressure responsive element 4 comprises a float box or container 6 and an inverted float 7. The inverted float 7 is attached to one end of a beam or lever 8, fulcrumed at 9 on a knife edge, jeweler's point or its equivalent.

The float box or container 6 contains a quantity of fluid 10, such as oil or water in which the float 7 is partially immersed. In order that the float 7 may be caused to rise or fall within container 6, as the pressure in pipe line 1 varies, a conduit 11 having communication with the interior of pipe line 1 and with the interior of float 7 at a point above the level of the liquid therein, is provided. As the pressures vary in pipe line 1, the float 7 rises or falls, depending upon the direction in which the pressure change takes place. In any event, movement of the float either in an upward or a downward direction, causes the beam or lever 8 to pivot on its fulcrum 9.

In order that movements of the float 7 may be utilized to affect the operation of the damper operating element or actuating device 5, the beam or lever 8 may be connected by a rod 12 through lever 13, link 14 and a bell crank 15 to the stem 16 of a valve 17 which controls the operation of the device 5.

Device 5 comprises, in general, a cylinder 18 having a piston P therein, piston rods 19 and 20 being connected to the opposite sides of the piston. When valve 17 is opearted in one direction, fluid under pressure enters from a source (not shown) through a valve port 21 to one side of the piston in cylinder 18 causing the piston rods 19 and 20 to move in one direction; and if valve 17 is operated to another position, fluid under pressure is caused to enter on the opposite side of the piston causing the piston rods to move in the opposite direction.

The piston rods 19 and 20 carry a frame 22, the lower end of which is connected to damper 2 by means of a connecting link 23, whereby as frame 22 moves, damper 2 is moved.

If connecting rod 12 is moved upwardly by float 7, lever 13 will be turned thereby in a counter clockwise direction, moving bell crank 15 and valve stem 16 downwardly. Such downward movement of the valve stem causes valve 17 to admit fluid, under pressure, to the cylinder 18. In response to the admission of said fluid to the cylinder, piston rods 19 and 20 are moved upwardly, carrying with them frame 22.

Frame 22 carries an angling bar 22' that operates to close valve 17 when the frame has traveled a predetermined distance. Bar 22' is pivotally mounted medially of its ends on the frame and is adjustably secured at its upper end in a yoke Y by a wing nut bolt T. The angularity of the bar 22' may be varied by means of an adjustment screw S, the bolt T serving to hold the bar rigidly in any adjusted position. The amount of angularity of bar 22' determines the rate of closing of valve 17. Angling bar 22' rides between rollers R carried at the upper end of a lever L that is pivotally mounted at its lower end on the framework carrying cylinder 18.

As shown in the drawing, one end of link 14 is pivotally connected to lever L so that when frame 22 moves upwardly the angling bar 22' causes lever L to turn in a clockwise direction moving link 14 to the right as viewed from the drawing. Movement of link 14 to the right causes bell crank 15 to turn in a counter-clockwise direction, whereby valve stem 16 is moved upwardly shutting off the fluid pressure to cylinder 18. Further upward movement of frame 22, therefore, ceases until valve stem 16 has again been moved downwardly to open valve 17. After each successive opening of valve 17, angling bar 22' operates, as aforesaid, to close the valve.

The angling bar 22' operates also to close valve 17 after each successive opening thereof, when frame 22 moves in a downward direction. It will therefore, be apparent that regulator frame 22 is caused to move in incremental steps in either direction, depending upon the direction in which connecting link 12 is moved by float 7.

So much of device or regulator 5 as described above, is shown in United States Letters Patent No. 1,371,243 granted to John M. Hopwood on March 15, 1921.

Where the regulating device shown in the drawing is applied to the control of pressures and such pressures must be maintained substantially constant within close limits, the pressure sensitive or pressure responsive elements, such as float 7, shall respond quickly to any change or deviation in pressure from the value to be maintained substantially constant.

In the control of pressures such as may obtain in pipe line 1, it often happens that the pressure to the right of damper 2 may increase or decrease a substantial amount, while only a relatively small movement of damper 2 is required to restore the pressure to the constant value sought to be maintained. Therefore, since float 7 responds quickly and is sensitive to any such change, any substantial increase in pressure or decrease in pressure may occasion a relatively large and sudden movement of the float. Such large, sudden movement of the float, if not properly restrained, may result in a relatively large movement of regulator frame 22, causing a correspondingly large movement of damper 2.

However, a large movement of damper 2 may over-correct the condition which caused the pressure in line 1 to increase or decrease, as the case may be. Therefore, if damper 2 should be opened too much, the pressure would drop sharply in pipe line 1, causing the float to move in the opposite direction a substantial amount. In response to such movement, the damper may be closed to such an extent that the condition responsible for the decrease in pressure is overcorrected, causing the float to over-travel in the opposite direction by an amount greater than that necessary to restore the pressure in pipe line 1 to the desired value.

Such operation of float 7 and the consequent control of the device 5 will obviously result in hunting of the system, and the pressure in pipe line 1 to fluctuate or deviate by substantial amounts from the desired constant value sought to be maintained.

In order to preclude hunting of the regulating device, so that it may operate to adjust damper 2 the proper amount necessary to restore the pressure in pipe line 1 to the desired value, a spring 24 and a lever 25 are provided. Lever 25 is pivotally mounted on a standard or bracket 27 carried by the framework of device 5. The end of lever 25 adjacent to regulator frame 22 may be bifurcated or of U-shape, having legs 28 that straddle a finger 29 of a bracket 30 secured to frame 22. Spring 24 is connected to lever 25 at a predetermined point to the left of pivot point 26 and to lever 8 at a predetermined point to the left of fulcrum 9.

Levers 8 and 25 may be provided with a plurality of openings 31 and 32, respectively, located at predetermined points from the extreme left-hand ends thereof.

Where a particular range of pressures to be controlled in line 1 are desired, such range of pressures may be obtained by attaching spring 24 to levers 8 and 25 at the proper points. The upper end of spring 24 is hooked into one or another of openings 32 and the lower end of the spring extends through one or another of the openings 31. The lower end of spring 24 extending below lever 8 is screw-threaded, as at 33, to accommodate a handwheel or adjustment nut 34. By means of the handwheel or adjustment nut an initial tension may be imposed on or set up in spring 24. The amount of initial tension imposed depends upon the value of the particular pressure to be regulated in pipe line 1.

Where the particular pressure to be maintained at a substantially constant value is determined, then such a tension is imposed on or set up in spring 24, by means of the handwheel or adjustment nut 34, as will balance the pressure acting upon float 7. The regulating device, shown in the drawing, will be in equilibrium, when the pressure acting on float 7 balances the initial tension set up in spring 24.

In choosing the type of spring 24 suitable for any particular condition, consideration must be given to the characteristics of the pressure responsive element or regulator employed. Therefore, for a given type of pressure responsive element or regulator, a spring 24 is selected having the proper characteristics. In any case, the characteristics of the spring are preferably such that it will yield or stretch freely or easily for small initial increases in length, and offer increasingly greater resistance to larger changes in length.

When the pressure responsive element, such as float 7, for example, is designed for small or short travel, spring 24 should be relatively short, but if designed for relatively long travel, the spring will be correspondingly longer. In any case the length of the spring will be such with respect to the travel of the pressure responsive element, that the resistance of the spring expressed in terms of variations in the controlled pressure, is very small.

In actual operation, there is a condition of equilibrium, and a slight resistance on the part of the spring to any movement whatever. The relative movement of the pressure responsive element, for a given change in pressure, must be made such that the spring will not interfere, to any appreciable extent, with the movement of the pressure responsive element required to actuate valve 17. However, if the controlled pressure tends to change by a large amount, spring 24 will offer rapidly increasing resistance, thereby preventing a correspondingly large movement of the pressure responsive element 7. Therefore, a large, sudden opening of valve 17, which would cause regulator frame 22 to move quickly with a long stroke, is prevented.

If a relatively small increase in pressure takes place in pipe line 1 to the right of damper 2, float 7 will move upwardly causing lever 8 to turn in a counter-clockwise direction about its pivot point 9. When such turning movement is relatively small, spring 24 will offer only small or slight resistance to upward movement of float 7.

As stated hereinbefore, upward movement of float 7 causes link 12 to move upwardly whereby, through lever 13, bell crank 15 and valve stem 16, valve 17 is opened to admit pressure to the under side of the piston in cylinder 18. Regulator frame 22 will, therefore, move upwardly. Since angling bar 22' is carried upwardly with the regulator frame, lever L will swing to the right, as viewed from the drawing, and cause the valve to close in the manner aforesaid.

As regulator frame 22 moves upwardly, the tension in spring 24 will cause lever 25 to turn in a counter-clockwise direction thereby relieving the tension in the spring. If the position to which damper 2 is adjusted, by the upward movement of the regulator 22, is such that the pressure in pipe line 1 is restored to the desired value, the pressure acting on float 7 will be in equilibrium with the tension initially imposed on spring 24. If, however, after the tension in spring 24 has been relieved, the pressure in pipe line 1 has not been restored to the value sought to be maintained, float 7 will again move upwardly affecting operation of valve 17 with resulting upward movement of the frame 22 in the manner aforesaid. Here again spring 24 is subjected to an increase in tension as a result of upward movement of the float 7, but this tension is relieved the moment regulator frame 22 moves upwardly. If the pressure acting on float 7 balances the force of spring 24 acting on lever 8, the system will be and remain in equilibrium until a subsequent change in pressure takes place in pipe line 1.

Where the tendency of the pressure in pipe line 1 is to increase, regulator 22 will move in incremental steps in the upward direction causing incremental adjustments of damper 2 towards its wide open position until the pressure in the pipe line has been restored to the desired value.

When a pressure change takes place and there is a movement of valve 17 and a consequent movement of regulator frame 22, arm 25 is moved in such a direction that the spring is returned to its original length and tension whereby equilibrium is again re-established with respect to the pressure in pipe line 1.

By changing the points of connection of spring 24 to levers 8 and 25, it is possible to cause the return movement of the upper end of the spring to be greater than the initial movement of the lower end thereof. The result of this would be that, after a new point of equilibrium has been reached, the spring tension would be different from what it was originally. Since the spring tension affects the equilibrium of the pressure responsive element 7, a new pressure would be set up in line 1.

It will be noted that spring 24, being under tension, tends to cause float 7 to move downwardly and oppose the pressure acting upwardly thereon. Therefore, if the tension in spring 24 is greater at one time than another, the pressure in line 1 acting on float 7 must be higher to maintain equilibrium. On the other hand, if the spring tension is lower, a lower pressure in line 1 is required to place pressure responsive element 7 in equilibrium with the spring tension. Therefore, it is possible to start with a given pressure in pipe line 1 and cause it to increase or to decrease with the movement of control device 5; or the spring 24 can be so adjusted that the pressure in line 1 will remain constant.

From the aforesaid, it will be apparent that the function of spring 24, in its manner of operation, is to first stabilize the pressure responsive mechanism and to prevent its sudden movement which would otherwise result in hunting of the regulator and, because of the action of regulator 5 thereon, to restore the pressure responsive element either to its original condition of balance or to a different condition requiring either a higher or a lower pressure in pipe line 1 to maintain equilibrium.

If it happens that the pressure in pipe line 1 is increased an appreciable amount above the desired value sought to be maintained constant, an abnormal movement of float 7 may take place. But, since the characteristic of spring 24 is such that it offers increasingly greater resistance when the float moves an abnormal amount, float 7 will not move suddenly and abruptly to that position to which it would move if not restrained by some device, such as spring 24. Therefore, valve 17 will be operated to admit fluid to the underside of the piston in cylinder 18 so that regulator frame 22 will move only a small amount in an upward direction, and damper 2 will be moved only a small amount.

While only one form of the invention has been shown and described herein, it is to be understood that variations, modifications and changes may be made therein without departing from the spirit and the scope of the invention. Therefore, it is desired that only such limitations shall be placed on the invention as are imposed by the prior art and the appended claims.

What I claim as new and desire to secure by Letters Patent is:

1. In combination, a pressure responsive element, a regulator controlled thereby, yielding means having operative connection between the regulator and pressure responsive element and adjusted to be normally in balance with said pressure responsive element, while said element is subjected to a predetermined pressure, the characteristic of said yielding means being such that it offers substantially no resistance to small movements of the pressure responsive element in response to slight changes in pressure and increasingly greater resistance to relatively large sudden movements of said element in response to greater changes in pressure, and means operated by the regulator for decreasing the opposing force exerted by said yielding means and tending to restore it to its normal balance with said pressure responsive element.

2. In combination, a pressure responsive element having a lever arm actuated thereby in accordance with changes in pressure acting at said element, a regulator comprising a piston and a cylinder, a frame movable by the piston, and a valve for controlling the admission of fluid under pressure to one side or the other of the piston, an operative connection between the valve and said lever arm, and a second lever arm, one end of which has an operative connection with said regulator frame and the opposite end having a spring connection with said first mentioned lever, said spring and second lever being normally in balance with said pressure element and arranged to offer substantially no resistance to small movements of the pressure element but offering increasingly greater resistance to relatively large sudden movements thereof, said second lever being disposed for operation by the regulator frame to decrease the resistance of the spring to movement of the pressure responsive element until said spring and second lever are restored to normal balance with said pressure responsive element.

3. In combination, actuating means operable in response to changes in pressure, a regulator having a movable element controlled by said actuating means, yielding means having operative connection between the movable member of said regulator and said pressure responsive element and adjusted to be normally in balance with said pressure responsive element, while said element is subjected to a predetermined pressure, the characteristic of said yielding means being such that it offers substantially no resistance to small movements of the pressure responsive element in response to slight changes in pressure and increasingly greater resistance to relatively large sudden movements of said element in response to greater changes in pressure, and means operated by said movable member for decreasing the opposing force exerted by said yielding means and tending to restore it to its normal balance with said pressure responsive element.

4. In combination, actuating means operable in response to changes in pressure, a regulator having a movable element controlled by said actuating means, and means connecting said movable element of the regulator and said actuating means arranged to offer increasing resistance to relatively large sudden movements of said actuating means and to automatically minimize said resistance as the movable member moves in response to such movements of the actuating means.

5. In combination, a pressure responsive element arranged to be acted upon by a pressure to be controlled, a regulator having a movable element controlled by said pressure responsive element arranged to control said pressure, and means interconnecting the movable element of said regulator and pressure responsive element arranged to offer increasing resistance to relatively large sudden movements of said pressure responsive element and to automatically minimize said resistance as the movable element moves and place the pressure responsive element in equilibrium with the pressure acting thereon when said pressure has been restored to the value existing before movement of the regulator took place.

6. In combination, a pressure responsive element arranged to be acted upon by a pressure to be controlled, a regulator having a movable member controlled by said pressure responsive element arranged to regulate said pressure, and means interconnecting the movable member of said regulator and pressure responsive element arranged to offer increasing resistance to relatively large sudden movements of said pressure responsive element and to automatically minimize said resistance as the movable member moves and place the pressure responsive element in equilibrium with a pressure, acting thereon, of a value lower than the pressure which caused movement of the movable member of the regulator to take place.

7. In combination, a pressure responsive element adapted to move in response to changes in pressure of a medium to be controlled, a regulator having means operated thereby to control the pressure of said medium, means yieldingly opposing movement of said pressure responsive element in one direction, said means and element being in balance when the pressure of said medium is at a predetermined value, and means controlled by said regulator adapted to place said yielding means and element in balance for each position attained by the regulator while moving in one direction.

8. In combination, a pressure responsive element, a regulator having a movable member under the control of said element, a spring yieldingly opposing movement of said element in one direction, and means controlled by said regulator adapted to decrease the opposing effect of said spring in proportion to the amount of deflection caused by said element.

9. In combination, a pressure responsive element, a regulator having a movable member under the control of said element, a spring yieldingly opposing movement of said element in one direction, means controlled by said regulator adapted to decrease the opposing effect of said spring in proportion to the amount it was deflected by said element, and means controlled by said regulator adapted to cause said spring to deflect in the opposite direction in proportion to the amount it was deflected by said element, thereby reducing the force exerted by said spring on the element each time said element and regulator move in one direction.

10. In combination, a pressure responsive element, a regulator having a movable member under the control of said element, a spring yieldingly opposing movement of said element in one direction, means controlled by said regulator adapted to decrease the opposing effect of said spring in proportion to the amount it was deflected by said element, said spring being adjusted to normally exert such a force on said element as to balance a pressure of a predetermined value acting on said element, said spring increasing the force exerted on said element as it moves in one direction, and means controlled by said regulator adapted to decrease the tension in said spring in proportion to the amount said tension was increased by said element.

11. In combination, a pressure responsive element, yielding means connected to said element and adapted to hold said element in equilibrium when a predetermined pressure acts thereon, and to yieldingly oppose movement of said element, a regulator under the control of said element adapted to actuate means affecting the pressure acting on said element, and means controlled by said regulator adapted to relieve the opposing effect of said yielding means on said element as said regulator moves in response to movement of said element.

ROBERT R. DONALDSON, Jr.